JOS. JOHNSTON
AND
E. O. MARLOW.
DOOR SILL.
No. 104321 — Patented Jun 14 1870
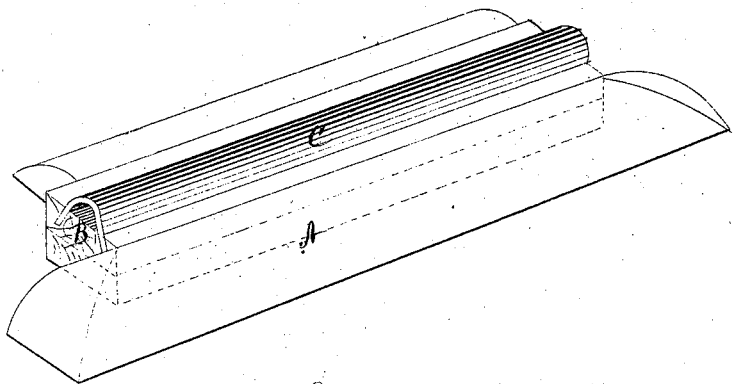
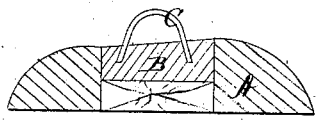
Witnesses
A. A. Yeatman
C. L. Ewert
Inventor
Joseph Johnston
E. O. Marlow
per Alexander & Mason
Attys.

United States Patent Office.

JOSEPH JOHNSTON AND EDMUND O. MARLOW, OF BRODHEAD, WISCONSIN.

Letters Patent No. 104,321, dated June 14, 1870.

IMPROVEMENT IN DOOR-SILLS.

The Schedule referred to in these Letters Patent and making part of the same.

*To all whom it may concern:*

Be it known that we, JOSEPH JOHNSTON and EDMUND O. MARLOW, of Brodhead, in the county of Green and in the State of Wisconsin, have invented certain new and useful Improvements in Door-Sills; and do hereby declare that the following is a full, clear, and exact description thereof, reference being had to the accompanying drawing and to the letters of reference marked thereon making a part of this specification.

The nature of our invention consists in the construction of a "door-sill" with rubber weather-strip attached.

In order to enable others skilled in the art to which our invention appertains to make and use the same, we will now proceed to describe its construction and operation, referring to the annexed drawing, in which—

Figure 1 is a perspective view, and
Figure 2 is an end view of our door-sill.

A represents a door-sill or threshold, of any suitable construction, provided on its upper side with a longitudinal groove for the insertion of a sliding bar, B.

In slots or grooves, on the upper side of the sliding bar, is inserted a rubber strip, C, curved upward, as shown in the drawing.

This slide, with rubber inserted, can be applied to any threshold by making a groove for it, and, when it is worn, it does not require that threshold and all be laid aside for a new one, but merely a new sliding bar, which, of course, costs considerably less.

We are aware that a door having a groove on its edge, with a strip which fits into said groove, holding a bulged piece of rubber between the strip and groove, is not new. Our invention is applied to a door-sill with a groove in it. The bulged rubber is inserted in oblique grooves in the movable strip, which fits into the groove in the door-sill, and not between the strip and the groove, as above cited, which acts as a wedge for the rubber.

What we claim is—

The combination of the grooved sill A and movable strip B, provided with oblique grooves, into which is inserted the bulged rubber C, all as shown and described.

In testimony that we claim the foregoing, we have hereunto set our hands, this 17th day of March, 1870.

JOSEPH JOHNSTON
E. O. MARLOW.

Witnesses to signature of JOHNSTON:
I. T. MACK,
J. M. MASON.

Witnesses to signature of MARLOW:
WENTWORTH FLIEGER,
J. M. MASON.